Aug. 2, 1966   A. E. RATHBUN   3,263,987

SPRING SEAT SUSPENSION

Filed Aug. 28, 1964

INVENTOR.
ALAN E. RATHBUN
BY *Hamilton & Cook*

ATTORNEYS

United States Patent Office 3,263,987
Patented August 2, 1966

3,263,987
SPRING SEAT SUSPENSION
Alan E. Rathbun, 3135 Highland Drive,
Cuyahoga Falls, Ohio
Filed Aug. 28, 1964, Ser. No. 392,762
6 Claims. (Cl. 267—103)

The present invention relates generally to spring seat suspensions. More particularly, the present invention relates to spring seat suspensions which provide the deep cushion front associated with plush lounge chairs. Specifically, the present invention relates to spring seat suspensions which provide deep front cushioning without side sway or pitching so as to be particularly suited for multiple passenger seating in automobiles and other vehicular transportation means.

A relatively soft seat which provides substantial vertical deflection generally allows side sway or lateral pitching of the person sitting thereon when the seat is in a vehicle in motion. This condition is very undesirable and led, initially, to the use of the more rigid bucket seat.

Subsequently, in my copending patent application, Ser. No. 287,077, filed June 11, 1963, now U.S. Patent No. 3,165,308, I disclosed a seat suspension having far more resiliency than those previously used in bucket seats and which, nevertheless, allowed a minimum of side sway by a construction embodying a minimum number of spring elements which are capable of being quickly and easily changed to suit varying conditions.

It is a primary object of the present invention to provide a spring seat suspension which eliminates side sway and pitching as effectively as the suspension taught in my aforesaid copending application and which simultaneously provides a greater range of deflection at the front of the seat.

It is another object of the present invention to provide a spring seat suspension, as above, which is readily adapted to accommodate a plurality of passengers.

It is a further object of the present invention to provide a spring seat suspension, as above, in which the transverse flexure as well as the vertical deflection of the suspension can be selected for the particular conditions of any given installation.

It is a still further object of the present invention to provide a spring seat suspension, as above, which is relatively uncomplex and inexpensive to manufacture and install.

These and other objects which will become apparent from the following specification are accomplished by means hereinafter described and claimed.

One preferred embodiment and one alternative embodiment are shown by way of example in the accompanying drawings and hereinafter described in detail without attempting to show all of the various forms and modifications in which the invention might be embodied; the invention being measured by the appended claims and not by the details of the specification.

Figure 1:
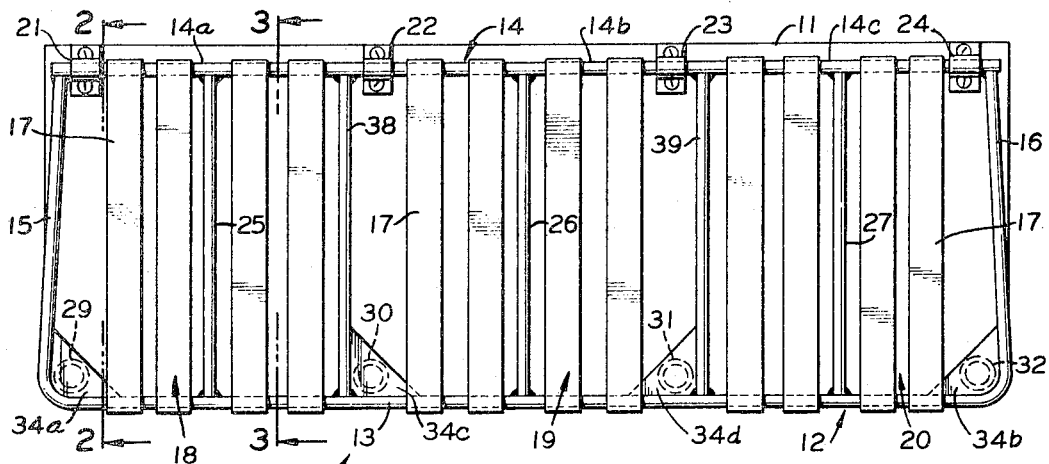
FIG. 1 is a top plan view of the improved spring seat suspension mounted on a rigid base.

In general, a spring seat suspension constructed according to the concept of the present invention utilizes a spring frame supported upwardly of a rigid base. The spring frame is constructed of resilient rods defining a rectangular shape so as to have a front and back. The spring frame has one or more seating areas and is supported above the base by hinge means positioned to the rear and laterally of the seating areas. A webbing extends between the front and back of the spring frame with at least one bowed transverse spring rod extending between the front and back, medially of the seating area, under compression yieldingly to resist transverse flexure of the front toward the back of the spring frame in response to loading on the webbing. The front of the frame is supported by resilient means to control the vertical deflection of the spring frame.

Referring more particularly to the drawings, the improved suspension is indicated generally by the numeral 10. The rigid base 11 of the suspension 10 provides a support as well as a mounting means by which the suspension may be secured in any desired location.

A rectangular spring frame 12 is supported upwardly of the base 11. The frame 12 has a front 13 and back 14 as well as sides 15 and 16 made of a resilient rod material. Extending between the front 13 and back 14 is a webbing 17. While the webbing 17 may be of any suitable material which is resilient and nonextensible, strip metal of tempered steel having ends wrapped around the front and back with the overlapping portions 16 secured together, as by spot welding, as indicated in the drawings, is quite satisfactory. Obviously, these straps may be diagonally wrapped, or interlaced, if desired.

While the subject suspension may be used to provide a single seating area, the embodiment depicted in the drawings is provided with three seating areas, indicated generally by the numerals 18, 19 and 20. A hinge means is positioned to the rear and laterally of each seating area. Thus, four hinges 21, 22, 23 and 24 are attached to the back 14 so as to support the spring frame 12 upwardly of the base 11. Hinge 21 extends between the base 11 and the frame 12 in proximity to one end of the back 14. That portion 14a of the back which extends between hinges 21 and 22 is freely extending—i.e., unsupported—and defines the rearmost member of the seating area 18. With this arrangement the greatest comfort can be imparted to seating area 18 without inducing pitch or sway.

Portions 14b and 14c similarly define the rear edge of seating areas 19 and 20 and are freely supported between hinges 22, 23, and 23, 24, respectively.

At least one bowed spring rod compression member is provided for each seating area. For the most satisfactory results the bowed spring rod is positioned medially of the seating area with ends abutting the front and back. In the multiple seating area suspension system depicted in the drawings, a bowed spring rod 25 is positioned medially of seating area 18 and is of such a length that it is bowed and held under compression between the front 13 and back 14. The ends of this rod 25 may be fitted into receiving grooves, or notches, in the resilient rod material forming the front 13 and back 14, or they may be welded thereto as indicated in the drawings.

Seating areas 19 and 20 are similarly provided with bowed spring rods 26 and 27.

These transverse bowed spring rods 25, 26 and 27 provide controlled yielding movement of the front 13 toward the back 14 and similarly, a slight movement of the freely suspended portions 14a, 14b and 14c toward the front 13 under load. The seating load is applied downwardly to the webbing, or straps, 17, and they are permitted to sag slightly, as controlled by the flexure of the bowed spring rods. This downward movement of the straps 15 provides a firmly comfortable contoured support to the person sitting thereon without any lateral deflection, thus eliminating sway and pitching.

Of course, a variety of load conditions can be individually accommodated by simply varying the diameter and/or the length of the individual spring rods 25, 26 and 27.

As an example of a suspension subjected to average loads, the frame rods comprising the front 13 and back 14 may be of 5/16" to 3/8" in diameter and the bowed spring rod may be 1/4" to 3/8" in diameter.

A spring means is also used to connect the front 13 to the base 11. In the preferred embodiment a plurality of helical compression springs are used, and these are spaced laterally of the seating area. As shown in the drawings, springs 29 and 30 are positioned laterally of seating area 18; springs 30 and 31 are positioned laterally of seating area 19; and, springs 31 and 32 are positioned laterally of seating area 20. By thus placing the springs laterally of the seating areas in opposition to the hinge means by which the back 14 is connected to the base 11, the portions of the front 13 which define the forward edge of each seating area are also freely extending and unrestricted to allow some transverse rearward flexure for the maximum of comfort.

Figure 2:
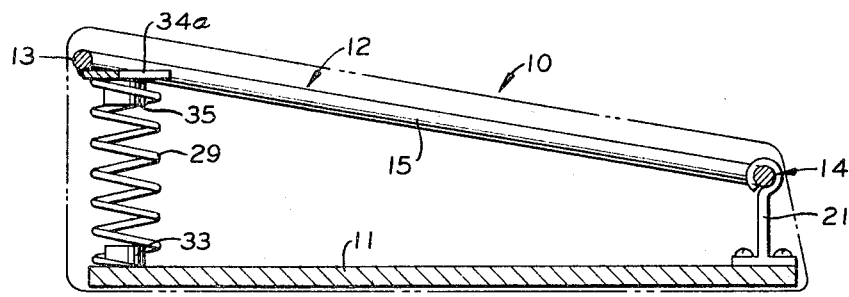
FIG. 2 is an enlarged cross section taken substantially on line 2—2 of FIG. 1.
Figure 3:
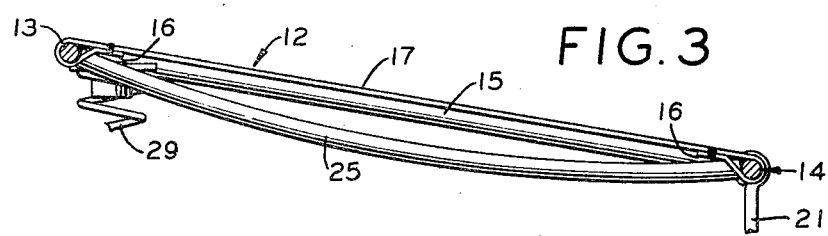
FIG. 3 is an enlarged cross section taken substantially on line 3—3 of FIG. 1.

The compression springs may be secured by suitable guide pins. As best seen in FIG. 2, a guide pin 33 extends upwardly from the base 11 to be insertably received in the lower portion of the compression spring 29. The lower portion of the other springs can be similarly secured.

To secure the upper end of each spring, a gusset plate 34 is attached to the spring frame 12 with downwardly depending guide pins 35.

The gusset plates 34a and 34b can be welded, or otherwise affixed, to the front 13 and sides 15 and 16, respectively. Plates 34c and 34d being positioned medially of the ends 15 and 16, must either be attached solely to the front 13 or may be attached at the juncture of the front 13 and the bowed secondary spring rods 38 and 39.

Rods 38 and 39 are similar to the primary bowed rods 25, 26 and 27 and are similarly attached to the frame 12. However, they are positioned laterally of the seating areas, and accordingly, extend between the front 13 and back 14 in proximity to the hinges (22, 23) and their respectively opposed springs (30, 31). These secondary rods 38 and 39 not only provide a second side support for the gussets 34c and 34d, but also assist the primary rods 25, 26 and 27 in resisting the tendency of the front 13 to move transversely toward the rear 14 when all three seating areas are filled, without in the least detracting from the comfortable seating provided by this suspension when only one person is seated thereon.

It should be apparent that the vertical flexure of the front 13 will be controlled by the particular compression spring means utilized. It must be further noted that the front 13 is constrained against movement away from the back 14 by the webbing 17 and that movement toward the back 14 is biasingly opposed by the resilient bowed spring rod members. In all other known single frame-multiple seating arrangements, the front member of the frame is either rigidly attached to the base or is inherently permitted to deform outwardly away from the back. In these prior known constructions, therefore, the cushion front is provided at the expense of a seat having side sway and pitching, or the side sway or pitching are eliminated at the expense of the cushion front.

Figure 4:
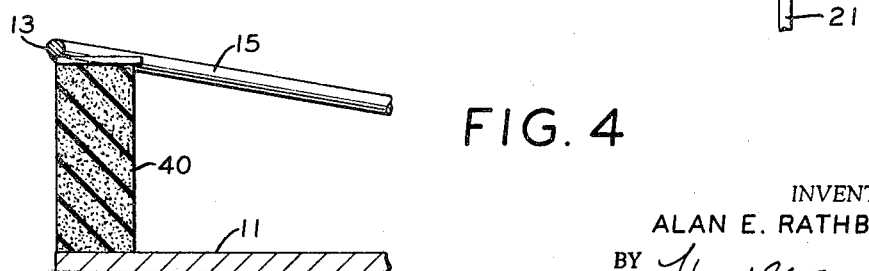
FIG. 4 is a view similar to a fragmentary area of FIG. 2 depicting an alternative form of vertical deflection spring means.

Of course, the cushion front effect is enhanced by the freely supported span of the front 13 between the compression springs. However, it has been found that if a resilient material 40 such as foam, or sponge (FIG. 4) is substituted for the compression springs, it may be permitted to extend across the complete front of the frame 12 without unduly restricting the flexure of the front 13 as required to assure the greatest comfort of the passenger at each seating area.

A spring seat suspension constructed according to the concept of the present invention is relatively uncomplex and can be manufactured and installed at low cost to provide cushion front comfort in vehiclular seating without pitching or side swaying and otherwise accomplishes the objects of the invention.

What is claimed is:

1. A spring seat suspension comprising, a base, a resilient rod rectangular spring frame having a front and back, a plurality of seating areas on said spring frame, a plurality of individual hinge means, said hinge means being attached to the back of said spring frame laterally of said seating areas with the back freely suspended therebetween and supporting said spring frame upwardly of said base, strap means extending between said front and back, at least one bowed spring rod for each said seating area, said spring rods being positioned medially of said seating areas and having ends abutting said front and back, compression means resiliently supporting the front of said spring frame upwardly of said base.

2. A spring seat suspension, as set forth in claim 1, in which the compression means comprises a plurality of individual compression springs, said individual springs extending between the front of said spring frame and the base laterally of said seating areas in opposition to said hinge means.

3. A spring seat suspension, as set forth in claim 2, in which at least one secondary spring rod extends between said front and back in proximity to said opposed hinge and compression means.

4. A spring seat suspension comprising, a base, a resilient rod rectangular spring frame having a front, back and opposed side portions, at least one seating area on said spring frame, said spring frame supported on said base by hinge means connecting the back of said spring frame to said base and resilient means interposed between the front of said spring frame and said base to permit said spring frame to swing through a limited arc about said hinge means, said hinge means being located laterally of said seating area, strap means extending between the front and back of said spring frame, and a bowed spring rod positioned generally medially of said seating area under compression and having ends abutting the front and back of said spring frame.

5. A spring seat suspension, as set forth in claim 4, in which there are a plurality of seating areas and a plurality of individual hinge means connecting the back of said spring frame to said base with at least one hinge means located laterally of each seating area.

6. A spring seat suspension, as set forth in claim 5, in which the back of said spring frame is freely suspended between individual hinge means and supported upwardly of said base.

References Cited by the Examiner

UNITED STATES PATENTS 3,165,308 1/1965 Rathbun _____ 267—11

FOREIGN PATENTS 785,892 11/1957 Great Britain.

ARTHUR L. LA POINT, *Primary Examiner.*